(12) United States Patent
Billups

(10) Patent No.: US 6,443,866 B1
(45) Date of Patent: Sep. 3, 2002

(54) POWER TRANSMISSION BELT

(75) Inventor: Wesley James Billups, Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/638,633

(22) Filed: Aug. 14, 2000

(51) Int. Cl.⁷ .................................................. F16G 5/08
(52) U.S. Cl. ...................................... 474/260; 474/263
(58) Field of Search ................................ 474/260–265, 474/237

(56) References Cited

U.S. PATENT DOCUMENTS

| | | | |
|---|---|---|---|
| 3,894,900 A | 7/1975 | Redmond, Jr. | 156/138 |
| 3,964,328 A | 6/1976 | Redmond, Jr. | 74/231 |
| 4,066,732 A | 1/1978 | Redmond, Jr. | 264/229 |
| 4,246,055 A | 1/1981 | Henderson | 156/138 |
| 4,692,291 A * | 9/1987 | Angell, Jr. | 264/109 |
| 4,952,293 A | 8/1990 | Sypals et al. | 204/180.7 |
| 5,066,344 A | 11/1991 | Inami et al. | 156/138 |
| 5,112,282 A * | 5/1992 | Patterson | 474/260 |
| 5,224,905 A * | 7/1993 | Mishima | 474/258 |
| 5,464,488 A * | 11/1995 | Servin | 156/73.4 |
| 5,653,656 A | 8/1997 | Thomas et al. | 474/205 |
| 5,971,879 A * | 10/1999 | Westhoff | 474/260 |
| 6,018,015 A | 1/2000 | Alex et al. | 523/332 |

FOREIGN PATENT DOCUMENTS

JP 4-34253 * 2/1992 ................. 474/263

* cited by examiner

Primary Examiner—David A. Bucci
Assistant Examiner—Vicky A. Johnson
(74) Attorney, Agent, or Firm—Bruce J. Hendricks; John D. DeLong

(57) ABSTRACT

An endless transmission belt having a tension section, a cushion section, a load carrying section disposed between the tension section and the cushion section, at least one drive surface having a fabric layer bonded to an outer surface of the belt and a layer of thermoplastic located between the fabric layer and the cushion section of the power transmission belt.

11 Claims, 1 Drawing Sheet

POWER TRANSMISSION BELT

BACKGROUND OF THE INVENTION

Recent developments in the automotive industry have resulted in an increase in the demands on the properties of power transmission belts. As a result, power transmission belts on these engines have been required to operate under higher loads, at higher speeds and at higher temperatures while reducing belt width and noise. The automotive industry demands a high quality belt capable of withstanding these severe conditions. One method to improve the properties of such belts has been to improve the materials from which the belts are made. For example, conventional polychloroprene rubber has been replaced with hydrogenated nitrile rubber and chlorosulfonated polyethylene. In addition, solid lubricants have been added to the rubber compositions to improve the abrasion properties of the belt by reducing the coefficient of friction.

SUMMARY OF THE INVENTION

The present invention relates to a power transmission belt that is characterized by a layer of thermoplastic located between a fabric layer on the drive surface and the cushion section of the belt.

BRIEF DESCRIPTION OF THE FIGURES

The accompanying figures show embodiments of this invention in which.

DETAILED DESCRIPTION OF THE INVENTION

Figure 1:
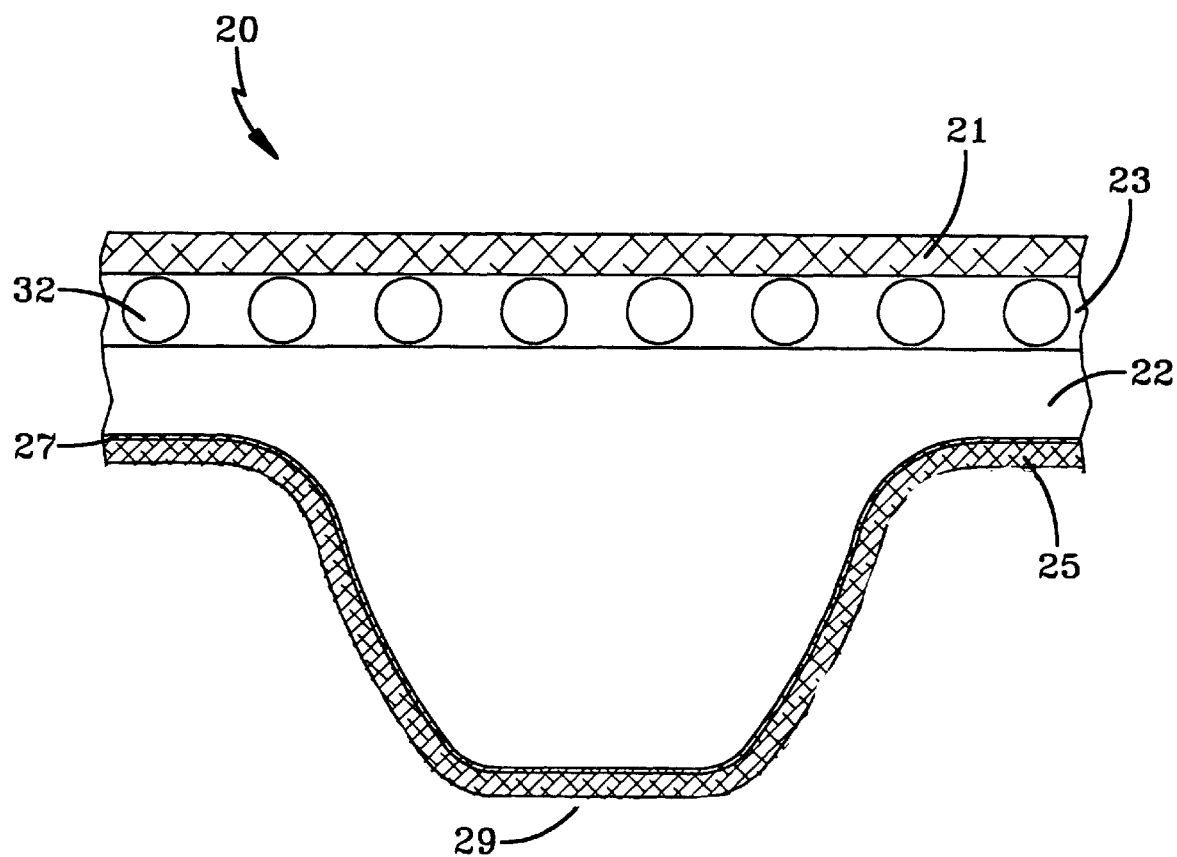
FIG. 1 is a fragmentary perspective view illustrating one embodiment of an endless power transmission belt of this invention.

There is disclosed an endless power transmission belt comprising
 (a) a tension section;
 (b) a cushion section;
 (c) a load-carrying section disposed between said tension section and cushion section;
 (d) at least one drive surface having a fabric layer bonded to an outer surface of the belt; and
 (e) a layer of thermoplastic located between the fabric layer and the cushion section of the power transmission belt.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in synchronous drive applications. The belt 20 is adapted to be used in so-called torque sensing drives, application where shock loads of varying belt tension are imposed on the belt, applications where the belt is operated at variable speeds, applications where the belt is spring-loaded to control its tension and the like.

The belt 20 comprises a tension section or backing 21, a cushion section 22, a load-carrying section 23 disposed between the tension section 21 and cushion section 22, and a fabric layer 25 adhered to drive surface 29. The belt has a layer of thermoplastic 27 which is located between the cushion section 22 and the fabric layer 25 to prevent or decrease the amount of rubber with cushion section 22 permeating through the fabric 25 to the drive surface 29.

In the belts of the present invention, there is at least one drive surface 29 having a fabric layer 25 bonded to the outer surface. In the embodiment shown in FIG. 1, there is one drive surface 29 having a fabric layer 25. In accordance with other embodiments, the belt 20 may have multiple drive surfaces of two or more. The fabric layer may also be on the outer surface of the belt which is not a drive surface.

The fabric layer 25 may be made from a woven, nonwoven or knitted fabric. The fabrics for use in the present invention are made of conventional materials including nylon (such as nylon 4,6, nylon 6,6 and nylon 6), cotton, polyester, cotton/polyester, nylon/polyester, cotton/nylon, Lycra™ (segmented polyurethane), aramid, rayon and the like. Preferably, the fabric is made of nylon 6,6.

The load-carrying section 23 has load-carrying means in the form of load-carrying cords 32 or filaments which are suitably embedded in an elastomeric load-carrying section 23 in accordance with techniques which are well known in the art. The cords may be transverse or parallel to the length of the belt. The cords 32 or filaments may be made of any suitable material known and used in the art. Representative examples of such materials include aramids, fiberglass, nylon, polyester, cotton, steel, carbon fiber and polybenzoxazole.

The drive surface 29 of the belt 20 of FIG. 1 is synchronous. In accordance with other embodiments and as discussed later, it is contemplated herein the belts of the present invention also include those belts where the drive surface of the belt may be smooth, single V-grooved, and multi-V-grooved. Representative examples of synchronous include belts having trapezoidal or curvilinear teeth. The tooth design may have a helical offset tooth design such as shown in U.S. Pat. Nos. 5,209,705 and 5,421,789.

The rubber compositions for use in the tension section 21, cushion section 22 and load-carrying section 23 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers (HNBR), polyurethane, elastomers marketed under the Viton™ designation and ethylene-acrylic elastomers sold under the name VAMAC and blends thereof.

The elastomers for use in the tension section 21, cushion section 22 and load carrying section 23 may be crosslinked by various peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as $\alpha,\alpha'$-bis(t-butylperoxy)-isopropylbenzene, 2,5-dimethyl-2,5-di(t-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of curing agent that is used may vary. Generally speaking, the level will range of from 0.1 to 10 phr (based on active parts of peroxide). Preferably, the level ranges from 1.8 to 3.0 phr.

In the belt of FIG. 1, there is one drive surface 29 having a fabric layer 25 bonded to the outer surface. Between the fabric layer 25 and the cushion section is the layer of thermoplastic 27. The thermoplastics which may be used in the present invention are well known to those skilled in the art. Generally speaking, the thermoplastic should have a melting point of from 82° C. to 265° C. Amongst those which can be used include polyethylene, polypropylene, polystyrene, acrylonitrile-butadiene-styrene, polybutylene terephthalate, polyamide 6, polyamide 66, polyamide 7, polyamide 11, polyamide 12, polyvinyl fluoride, polyvinyl chloride, polyether, polybutylenes, polyamides, polycarbonates, polyether amides, polyurethanes and polyvinylidene fluoride. Preferably, the thermoplastic is polyvinylidene fluoride. The polyvinylidene fluoride layer may be the homopolymer of vinylidene fluoride or a copolymer of vinylidene fluoride and another monomer. One or more monomers selected from the group consisting of tetrafluoroethylene, hexafluoropropylene, monochlorotrifluoroethylene, vinyl fluoride, perfluorovinylalkyl ethers, vinyl acetate and ethylene can be used for copolymerization with vinylidene fluoride.

The thermoplastic fluoride layer is preferably applied in the form of a film. The film is generally transparent and may be an unoriented film produced by the techniques of extrusion or casting or an oriented film obtained by stretching the unoriented film.

Commercially available films of polyvinylidene fluoride may be used to construct the belts of the present invention. Such films include those that are commercially available from Westlake Plastics Company of Lenni, Pa.

The thickness of the thermoplastic layer may vary. Generally speaking, the thickness may range from 0.0125 mm (0.5 mil) to 1.25 mm (50 mils). Preferably, the thickness ranges from 0.05 mm (2 mils) to 0.20 mm (8 mils).

The thermoplastic layer 27 may be applied to the fabric and heated to adhere the thermoplastic to the fabric. Preferably, this is done prior to application of the fabric to the cushion section 22 during construction of the belt 20.

The power transmission belts may be built on a drum device. First, the fabric and thermoplastic layer are applied to the drum. Next, the cord or tensile member (load carrying section) is spiraled onto the drum. Thereafter, the cushion section is applied onto the tension section. The thermoplastic layer or film may be heat bonded to the facing fabric and thereafter laminated onto the cushion section. Another alternative is to apply the thermoplastic layer film and fabric separately relying on the heat during cure to mechanically bond the two layers. The assembled laminate or slab is then placed in a mold, cured and cut into the belts in a manner known to those skilled in the art.

EXAMPLE

The belts of the present invention were prepared in the following manner. A resorcinol formaldehyde latex dipped nylon 6,6 knit fabric was laminated with 0.1 mm of a polyvinylidene fluoride film obtained from Westlake Plastic Company. The filer was laminated to the fabric in a flat platen press at 191° C. This fabric laminate was placed on the drum with the polyvinylidene fluoride layer out. Fiberglass cord dipped in an adhesive was spiraled onto the drum. A rubber sheet of hydrogenated NBR was applied onto the cord to form the cushion section. Finally, a cotton/polyester fabric backing was applied to the drum device. The belts were cured at 176° C. and cut in widths of 32 mm (1.25 inches).

While certain representative embodiments and details have been shown for the purpose of illustrating the invention, it will be apparent to those skilled in this art that various changes and modifications may be made therein without departing from the spirit or scope of the invention.

What is claimed is:

1. An endless power transmission belt comprising
   (a) a tension section;
   (b) a cushion section;
   (c) a load-carrying section disposed between said tension section and cushion section;
   (d) at least one drive surface having a fabric layer bonded to an outer surface of the belt; and
   (e) a layer of thermoplastic located between the fabric layer and the cushion section of the power transmission belt.

2. The power transmission belt of claim 1 wherein the layer of thermoplastic ranges from 0.0125 mm to 1.25 mm thick.

3. The power transmission belt of claim 1 wherein said thermoplastic is selected from the group consisting of polyvinylidene fluoride, polyethylene, polypropylene, polystyrene, acrylonitrile-butadiene-styrene, polybutylene terephthalate, polyamide 6, polyamide 66, polyamide 7, polyamide 11, polyamide 12, polyvinyl fluoride, polyvinyl chloride, polyether, polybutylenes, polyamides, polycarbonates, polyether amides, polyurethanes and polyvinylidene fluoride.

4. The power transmission belt of claim 3 wherein said thermoplastic is polyvinylidene fluoride.

5. The power transmission belt of claim 1 wherein said thermoplastic has a melting point ranging from 82° C. to 265° C.

6. The power transmission belt of claim 1 wherein the fabric layer is selected from the group consisting of woven, non-woven and knitted fabrics.

7. The power transmission belt of claim 1 wherein a peroxide containing curing agent is present.

8. The power transmission belt of claim 7 wherein said peroxide containing curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate, n-butyl-4,4-bis (t-butyl peroxy) valerate, α,α-bis (t-butylperoxy)-isopropylbenzene, 2,5-dimethyl-2,5-di(5-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di(benzoylperoxy)-hexane, benzoyl peroxide and mixtures thereof.

9. The power transmission belt of claim 1 having one driving surface.

10. The power transmission belt of claim 4 wherein said polyvinylidene fluoride is selected from the group consisting of a homopolymer of vinylidene fluoride and copolymers of vinylidene fluoride and another monomer.

11. The power transmission belt of claim 10 wherein said additional monomer is selected from the group consisting of tetrafluoroethylene, hexafluoropropylene, monochlorotrifluoroethylene, vinyl fluoride, perfluorovinylalkyl ethers, vinyl acetate and ethylene.

* * * * *